C. F. SCHEPMANN.
CATTLE POKE.
APPLICATION FILED MAR. 21, 1910.
981,480.
Patented Jan. 10, 1911.
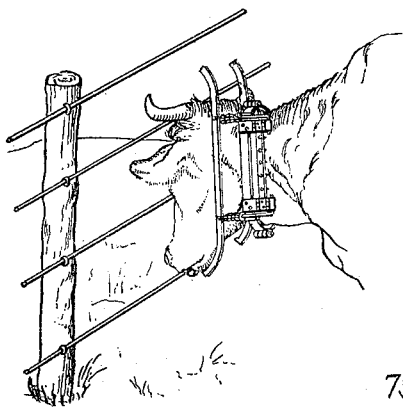
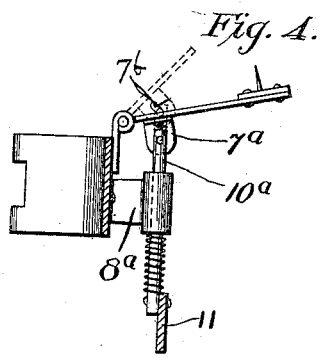
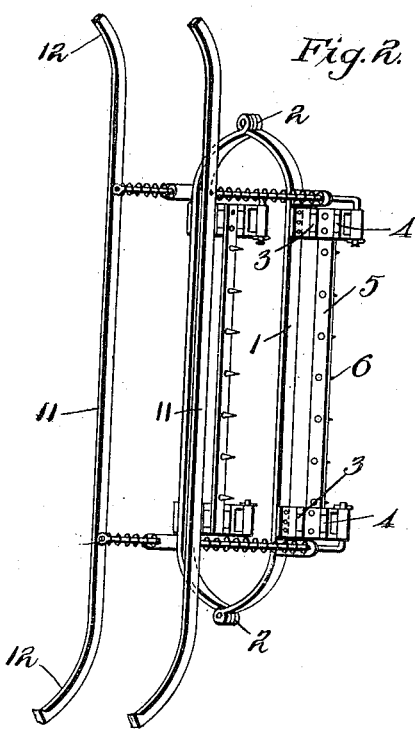
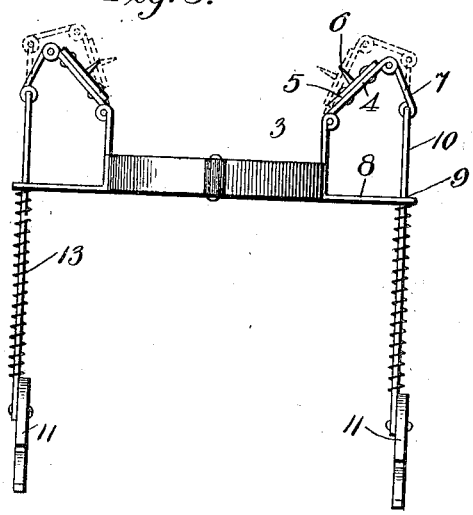
Witnesses
W. Max Duvall
Inventor
C. F. Schepmann
his Attorneys

UNITED STATES PATENT OFFICE.

CHRISTIAN F. SCHEPMANN, OF ELLIS, KANSAS.

CATTLE-POKE.

981,480.

Specification of Letters Patent. Patented Jan. 10, 1911.

Application filed March 21, 1910. Serial No. 550,785.

*To all whom it may concern:*

Be it known that I, CHRISTIAN F. SCHEPMANN, a citizen of the United States, residing at Ellis, in the county of Ellis and State of Kansas, have invented certain new and useful Improvements in Cattle-Pokes; and I do hereby declare the following to be a full, clear, and exact description of the invention, such as will enable others skilled in the art to which it appertains to make and use the same.

This invention relates to improvements in cattle pokes, and the object of the invention is to provide effective means for preventing cattle from tearing down fences and which will not have injurious effects upon the cattle, as in the style of pokes wherein pricking means is located on the bony part of the head or face.

By my invention the pricking means is arranged on a suitable collar and extends rearwardly, so that the pricking pins engage the neck of the animal.

The particular features of novelty will be pointed out in the claims, and while the invention is not restricted to the exact details shown and described, still for the purpose of disclosure reference is had to the accompanying drawings illustrating the invention, in which like characters designate the same parts in the several views, and in which—

Figure 1 is a perspective view showing a cow provided with my improved cattle poke in the position worn by the animal. Fig. 2 is a perspective detail view of the poke looking from the front. Fig. 3 is a top plan view, the normal position of the prick bars being shown in full lines, and the operative positions being shown in dotted lines, and Fig. 4 is a sectional fragmentary view on a line through the collar and engaging bars just above the top edge of the prick bar on one side of a slightly modified form.

1 designates an elongated collar of proper rigidity to prevent the same from turning on the animal's neck, and this collar may be made of a pair of detachable sections linked together at their ends at 2 by suitable pins. On the rear edge of these collar sections is pivoted a prick bar, and in the drawings the construction shown is a hinge section 3 at each end of each side of the collar projecting rearwardly, and to this member is hinged a second hinge member 4 at each end of the collar sections, which second hinge members are connected by the longitudinal prick bar 5 provided with pricking pins 6.

Extending forwardly from the prick bars are the arms 7, the ends of which substantially register with the ends of the brackets 8, apertured, as at 9, to form sleeve or guide openings for rods 10 connected at one end to the forwardly projecting arm 7, and at their other ends connected to vertical elongated engaging bars 11, which bars preferably have outwardly curved ends 12. In the construction shown in Figs. 2 and 3, the arms 7 are illustrated as hinged to the arms 4. 13 designates resilient means, in the form of a coiled spring, encircling said rods 10 and disposed between said brackets 8 and the engaging bars 11.

In the construction illustrated in Fig. 4 the forwardly extending short arms $7^a$, corresponding to 7 in the other figures, are in the form of rigid ears or lugs terminating adjacent the bracket members $8^a$, apertured to form guide openings or sleeves for the rods $10^a$ connecting the engaging bars with the lugs or ears $7^a$, and similarly a coiled spring encircles the rods $10^a$ between the brackets $7^a$, and the engaging bars are normally held in a distended position contractible upon pressure on the engaging bars. The inner ends of the rods $10^a$ are slotted or split to straddle the short arms $7^a$, being connected thereto by pins passing through the forked ends of the rods and operating in slots $7^b$ formed in the short arms, the slots permitting the short arms $7^a$ to swing around with the prick bars without the rods $10^a$ binding within their supporting sleeves.

I claim—

1. In a cattle poke, the combination of a rigid suitably shaped collar, a prick bar pivoted to said collar and extending laterally from the rear thereof, elongated engaging means disposed forwardly of said collar and bodily movable rearwardly and forwardly in the same plane, rigid connecting means between said prick bar and engaging means, and movable in an axial direction, and resilient means disposed between said engaging means and collar, substantially as described.

2. In a cattle poke, the combination of a suitably shaped rigid collar, a pair of engaging bars, bodily movable rearwardly and forwardly in parallel planes, and a pair of laterally swinging prick bars, said bars being movably mounted with respect to said collar, axially movable means rigidly connecting an engaging bar with its corresponding prick bar, and resilient means disposed between said engaging bars and said collar to hold said prick bars normally in their open position, substantially as described.

3. In a cattle poke, the combination of an elongated rigid collar, a prick bar pivotally connected to each side of said collar disposed laterally at the rear thereof, said prick bars being provided with forwardly extending arms and the sides of said collar being provided with brackets having guide sleeves disposed adjacent the ends of said prick bar arms, elongated engaging bars forwardly of said collar, rods mounted in said sleeves and connecting said engaging arms with said prick bar arms, and coiled springs encircling said rods and interposed between said engaging arms and said brackets, substantially as described.

In testimony whereof, I affix my signature, in presence of two witnesses.

CHRISTIAN F. SCHEPMANN.

Witnesses:
 FRED OHLEMEIER,
 JOSEPH AST.